UNITED STATES PATENT OFFICE.

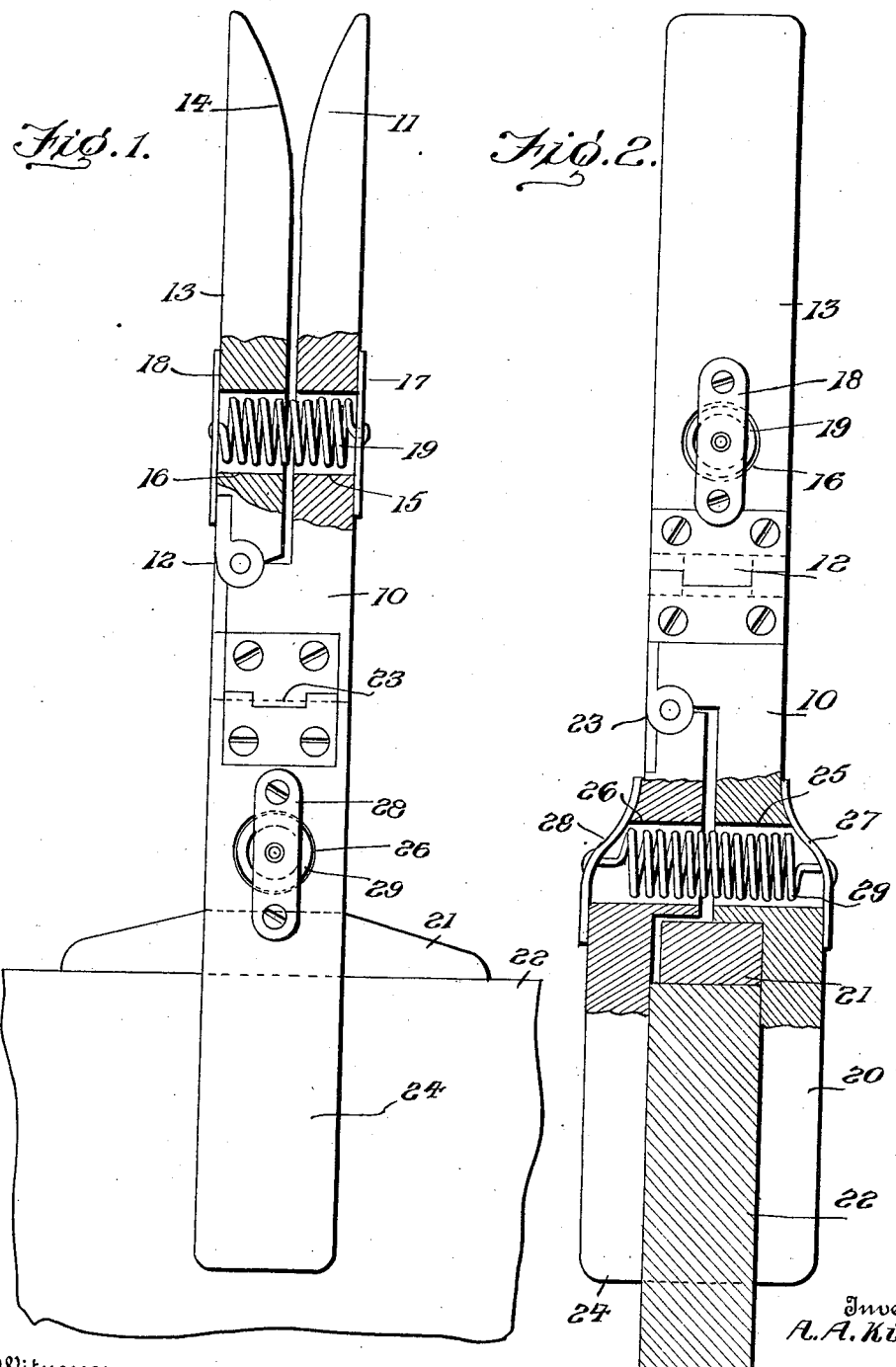

ARCHIE A. KINION, OF MANNFORD, OKLAHOMA.

REIN-HOLDER.

1,087,666.  Specification of Letters Patent.  Patented Feb. 17, 1914.

Application filed May 29, 1913. Serial No. 770,706.

*To all whom it may concern:*

Be it known that I, ARCHIE A. KINION, citizen of the United States, residing at Mannford, in the county of Creek and State of Oklahoma, have invented certain new and useful Improvements in Rein-Holders, of which the following is a specification.

This invention relates to improvements in rein holders for attachment to a vehicle, and has for one of its objects to improve the construction and increase the efficiency and utility of devices of this character.

Another object of the invention is to provide a simply constructed device which may be readily attached to the dashboard or the forward end gate portion of a vehicle, and which may be readily transferred from one vehicle to the other without material structural change either in the vehicle or in the device.

With these and other objects in view the invention consists in certain novel features of construction as hereinafter shown and described and then specifically pointed out in the claims, and in the drawings illustrative of the preferred embodiment of the invention.

Figure 1 is a front elevation of the improved device applied and partly in section. Fig. 2 is a side elevation of the same likewise partly in section.

Corresponding and like parts are referred to in the following description and indicated in all the views of the drawings by the same reference characters.

The improved device comprises a stock or body portion 10 reduced near the upper end and curved outwardly as represented at 11 to form one of the receiving jaws. Hingedly united at 12 to the stock 10 is an opposing member 13 out-turned at its upper end at 14 to form another jaw opposed to the jaw 11. The members 10 and 13 are provided with relatively large transverse apertures 15—16. Clip plates 17—18 are connected respectively to the members 10—13 and extend over the outer ends of the apertures 15—16. A relatively strong spring 19 extends through the apertures 15—16 and is connected at its ends in the clip plates 17—18. The outwardly curved space between the jaws 11—14 forms a socket into which the reins are forced and thereby held from movement, as hereafter explained.

The stock 10 is reduced at its lower end to form a reduced bearing portion 20 and with a transverse bearing member 21. The portion 20 is designed to bear against one side of the forward end gate of a vehicle, a portion of which is represented at 22, with the lateral member 21 bearing upon the upper edge of the end gate.

Hingedly united at 23 to the stock 10 is an opposing bearing member 24 which bears upon the opposite side of the end gate. The stock 10 and the member 24 are provided respectively with transverse openings 25—26 which register with each other, and with clips 27—28 connected respectively to the members 10 and 24 and extending over the apertures 25—26. A spring 29 is connected to the clips 27—28 and extends through the apertures 25—26, and exerts its force to maintain the member 24 yieldably in engagement with the end gate member 21. By this means the stock 10 is firmly supported upon the end gate and prevented from lateral movement by the lateral bearing member 21 and prevented from forward and rearward movement by the coaction of the portions 20 and 24 of the device. By this means it will be obvious that the device may be readily adapted to the end gate portion of a vehicle and as readily removed when not required.

By this simple device the driving reins may be readily supported and held from displacement while the team is hitched or when standing still, and may be readily detached when the team is to be started.

The device may be constructed of any suitable material as light as possible consistent with the strains to which it will be subjected, and may be of any required size and modified without structural change to correspond to different thicknesses of end gates or to dashboards or other portions of the vehicle to which the device is to be attached.

Having thus described the invention, what is claimed as new is:

1. A rein holder comprising a stock having a stationary rein receiving jaw at one end and a stationary vehicle engaging jaw at the other end, a movable jaw coacting with said stationary rein engaging jaw, a movable jaw coacting with said stationary vehicle engaging jaw, means for yieldably supporting said movable rein engaging jaw, and means for yieldably supporting said movable vehicle engaging jaw.

2. A rein holder comprising a stock having lateral shoulders spaced apart and with a stationary rein receiving jaw at one end and a stationary vehicle engaging jaw at the other end, a movable jaw coacting with said stationary rein engaging jaw and engaging one of said stop shoulders, a movable jaw coacting with said stationary vehicle engaging jaw and engaging the other stop shoulder, means for yieldably supporting said movable rein engaging jaw, and means for yieldably supporting said movable vehicle engaging jaw.

3. A rein holder comprising a stock having a stationary rein engaging jaw at one end and a stationary vehicle engaging jaw at the other end, a lateral bearing member carried by the stock, a movable jaw coacting with said stationary rein engaging jaw, a movable jaw coacting with said stationary vehicle engaging jaw, means for yieldably supporting said movable rein engaging jaw, and means for yieldably supporting said movable vehicle engaging jaw.

4. A rein holder comprising a stock having a stationary rein receiving jaw at one end and a stationary vehicle engaging jaw at the other end, a movable jaw coacting with said stationary rein engaging jaw, a movable jaw coacting with said stationary vehicle engaging jaw, said stationary jaws and movable jaws having transverse registering apertures, clips bearing over said apertures, and springs connected to the clips and extending respectively through the apertures and operating to yieldably maintain the jaws.

In testimony whereof I affix my signature in presence of two witnesses.

ARCHIE A. KINION. [L. S.]

Witnesses:
H. W. CHRONIC,
B. H. KINION.

---

Copies of this patent may be obtained for five cents each, by addressing the "Commissioner of Patents, Washington, D. C."